United States Patent [19]

Mouri

[11] Patent Number: 5,333,700
[45] Date of Patent: Aug. 2, 1994

[54] STEERING SYSTEM FOR A MOTOR VEHICLE

[75] Inventor: Toyohiko Mouri, Ohta City, Japan

[73] Assignee: Fuji Jukogyo Kabushiki Kaisha, Tokyo, Japan

[21] Appl. No.: 928,775

[22] Filed: Aug. 13, 1992

[30] Foreign Application Priority Data

Aug. 26, 1991 [JP] Japan .................................. 3-238809

[51] Int. Cl.$^5$ ............................................. B62D 6/00
[52] U.S. Cl. ................................................... 180/79.1
[58] Field of Search ................... 180/79.1, 141, 142; 74/388 PS

[56] References Cited

U.S. PATENT DOCUMENTS

| | | | |
|---|---|---|---|
| 4,556,116 | 12/1985 | O'Neil | 180/79.1 |
| 4,573,545 | 3/1986 | Kalns | 180/79.1 |
| 4,765,425 | 8/1988 | Saito et al. | 180/79.1 |
| 4,986,381 | 1/1991 | Morishita et al. | 180/79.1 |
| 5,145,022 | 9/1992 | Kido | 180/79.1 |
| 5,230,397 | 8/1993 | Tranchon | 180/79.1 |

*Primary Examiner*—Mitchell J. Hill
*Attorney, Agent, or Firm*—Beveridge, DeGrandi, Weilacher & Young

[57] ABSTRACT

A steering system for a motor vehicle which makes gear boxes common for the motor vehicle equipped with the steering system and a motor vehicle not equipped with the same, and which is reduced in size. A stopper engagement portion which restricts a relative rotation within a predetermined angular extent is formed between an input shaft side sleeve and an output shaft side sleeve. A gear ratio changing mechanism which is meshed with both a gear of the input shaft side sleeve and a gear of the output shaft side sleeve is constructed of an input side ring gear which includes an input side gear meshed with the input shaft side gear and an internal gear meshed with an input side planetary gear, an output side ring gear which includes an output side gear meshed with the output shaft side gear and an internal gear meshed with an output side planetary gear, and a planetary gear carrier which rotatably supports the input side and output side planetary gears in a unitary state and which is driven to rotate by a gear ratio changing motor through a reversible rotation gear mechanism.

3 Claims, 5 Drawing Sheets

5,333,700

STEERING SYSTEM FOR A MOTOR VEHICLE

BACKGROUND OF THE INVENTION

1. Field of the Invention

The present invention relates to a steering system for a motor vehicle, and more particularly to a steering gear ratio changing system.

2. Description of the Prior Art

There has already been developed and laid open in the official gazette of Japanese Patent Application Laid-open No. 209362/1985 a steering gear ratio changing system comprising an input sun gear and an output sun gear whose numbers of teeth are unequal and which are respectively connected to an input shaft and a pinion shaft, wherein planetary gears are respectively meshed with the sun gears and are rotatably supported on a common gear carrier in a coaxial and unitary state, and wherein the gear carrier is rotated by a motor through a worm gear having a self-locking function.

In general, in a passenger motor car, ordinary steering torques lie in a range smaller than 1 kgfm, whereas a steering torque of or above 10 kgfm arises, for example, when a wheel tire has hit against a curbstone stone in a shocking manner.

Accordingly, in the gear ratio changing system as mentioned above wherein a steering torque loaded on a steering system is transmitted through the planetary gear device which constructs transmission ratio changing gearing, structural strengths need to be set on the basic condition that a transmission torque required of the transmission ratio changing gearing is larger than a transmission torque which can arise in the steering system, for example, the transmission torque ( about 10 kgfm) which arises at the shock of the wheel tire against the curbstone. This poses the problem that the planetary gear device cannot avoid being made unnecessarily large in size.

SUMMARY OF THE INVENTION

An object of the present invention is to provide a steering system for a motor vehicle according to which the size and the weight of a gear ratio changing mechanism including a gear ratio changing motor can be respectively reduced and lightened.

Another object of the present invention is to provide a steering system for a motor vehicle according to which a gear box for a motor vehicle equipped with a steering gear ratio changing system can be also used as one for a motor vehicle not equipped with any steering gear ratio changing system.

In one aspect of performance of the present invention, there is provided a steering system for a motor vehicle having, an input shaft connected with a steering wheel via a first torque sensor for steering said motor vehicle, an output shaft coaxially connected to said input shaft for transmitting a steering force from said steering wheel to a pinion shaft via a second torque sensor, and an assist motor meshed with said output shaft via a worm gear for assisting said steering force, an improvement of the system which comprises:

an input shaft sleeve coaxially interposed between said input shaft and said output shaft for transmitting said steering force to said output shaft;

a first gear formed on an outside periphery of said sleeve;

a second gear formed on an outside periphery of said output shaft;

an input ring gear meshed with said first gear and provided in a gear ratio changing mechanism;

an inside input gear formed inside said input ring gear;

an input planetary gear meshed with said inside input ring gear and supported by a carrier;

an output planetary gear supported by said carrier and being coaxial with said input planetary gear;

an output ring gear meshed with said second gear and being coaxial with said input ring gear;

an inside output gear formed inside said output ring gear and meshed with said output planetary gear;

stopper means formed between said input shaft and said output shaft for restricting a rotational and relative movement therebetween; and a motor connected with said carrier via a reversible gear for changing a gear ratio of said input and output planetary gears so as to stop said gear ratio changing motor when said steering torque is larger than a predetermined value and to rotate said gear ratio changing motor when a steering torque based on said steering force is smaller than said predetermined value;

said gear ratio changing motor becoming free to rotate or applying to generate a torque increase when said steering torque is larger than said predetermined value so as to effectively absorb a shock exerted from said output shaft and to be widely and easily used for any types of said steering system.

In another aspect of performance of the present invention, the system for a motor vehicle further comprises the fact that an angular velocity ratio between said input and output shafts is set 1 (one) when said reversible gear driven by said gear ratio changing motor is fixed.

Owing to the above, an excessive torque load ascribable to the collision of the motor vehicle against a curbstone or the like is prevented from acting on the gear ratio changing mechanism, so that the gear ratio changing mechanism which includes the gear ratio changing motor can be reduced in size and lightened in weight. Moreover, when the angular velocity ratio between the input shaft and the output shaft with the planetary gear carrier fixed is set at 1 (one), steering gear boxes for the motor vehicle equipped with the steering system and for a motor vehicle not equipped with the same can be made common.

PREFERRED EMBODIMENTS OF THE INVENTION

Figure 1:
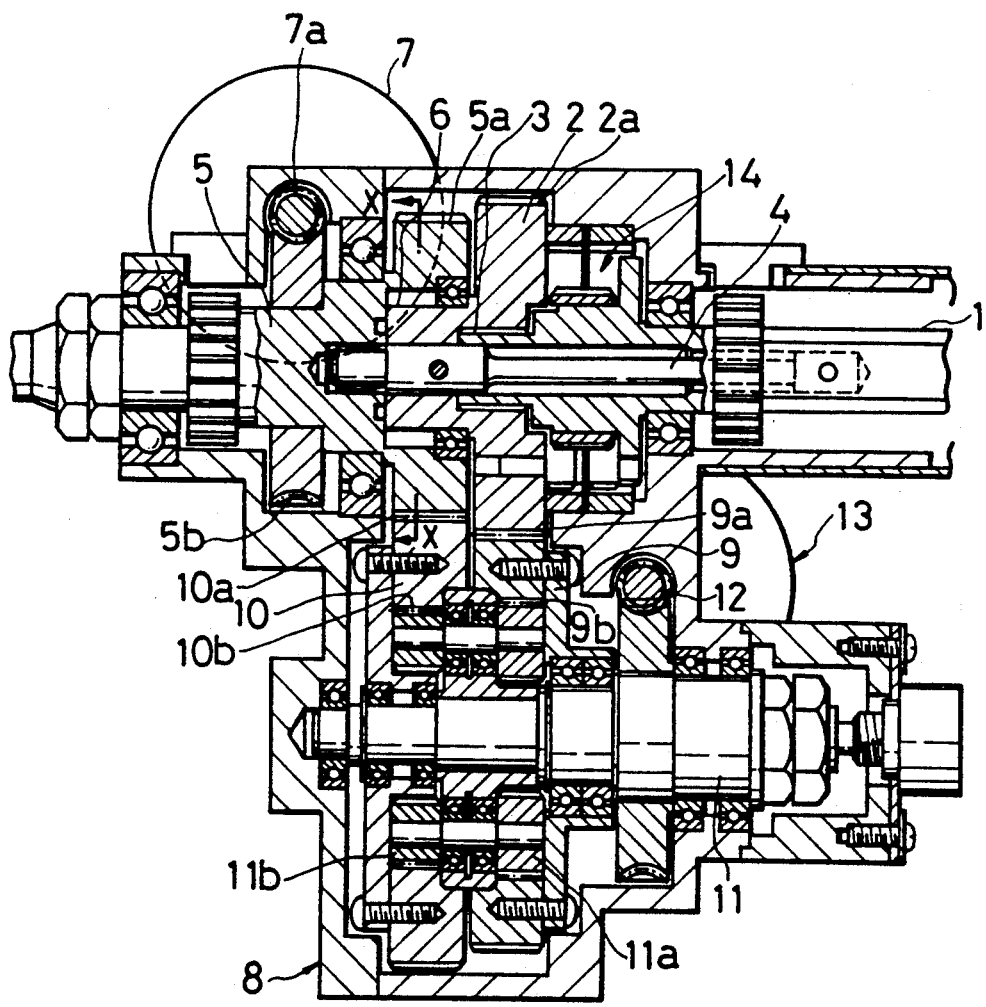
FIG. 1 is a sectional view showing the first embodiment of the present invention.

FIG. 1 is a sectional view showing a steering system for a motor vehicle in an embodiment of the present invention. Numeral 1 indicates an input shaft such as steering shaft which is connected to a steering handle not shown, and numeral 2 an input shaft side sleeve. The input shaft 1 and the input shaft side sleeve 2 have a structure in which they are fittingly connected to each other through splines for a stopper 3 so as to be rotatable independently of each other relatively within the first extent of predetermined rotational angle (for example, 6°), and in which they are connected by a torsion bar 4. When the steering handle is manipulated to rotate, the rotation is transmitted from the input shaft 1 to the input shaft side sleeve 2 through the torsion bar 4 within the first predetermined angular extent. In addition, the outer periphery of the input shaft side sleeve 2 is formed with a gear 2a which is meshed with an input side gear 9a formed at the outer periphery of an input side ring gear 9 constituting a gear ratio changing mechanism 8 to be described later.

Figure 2:
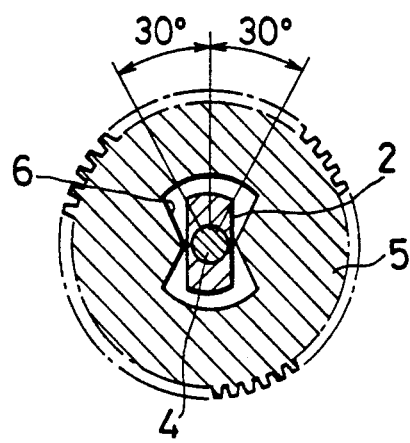
FIG. 2 is a sectional view taken along line X—X in FIG. 1.

Numeral 5 designates an output shaft side sleeve which is connected to an output shaft such as the pinion shaft of a gear box of rack-and-pinion type not shown. An engagement portion for a stopper 6 is formed between the output shaft side sleeve 5 and the fore end part of the input shaft side sleeve 2, and it locks the sleeves 2 and 5 when they are relatively rotated a second predetermined angle (for example, 30°), as illustrated in FIG. 2. Besides, the outer periphery of the output shaft side sleeve 5 is formed with a gear 5a which is meshed with an output side gear 10a formed at the outer periphery of an output side ring gear 10 constituting the gear ratio changing mechanism 8, and a power steering gear 5b which is meshed with a gear 7a formed on the output shaft of an electric motor for a power assist control 7 in the electric power steering system for a power assist corresponding to a turning steering torque.

The gear ratio changing mechanism shown at numeral 8 is configured of the input side ring gear 9 which includes the input side gear 9a meshed with the gear 2a formed at the outer periphery of the input shaft side sleeve 2, the output side ring gear 10 which includes the output side gear 10a meshed with the gear 5a formed at the outer periphery of the output shaft side sleeve 5, and a planetary gear carrier 11 by which an input side planetary gear 11a meshed with an internal gear 9b formed at the inner periphery of the input side ring gear 9 and an output side planetary gear 11b meshed with an internal gear 10b formed at the inner periphery of the output ring gear 10 are turnably supported in a unitary state and which is geared to an electric motor for a gear ratio changing control 13 through a reversible rotation gear mechanism 12 including, for example, a worm shaft and a worm wheel in combination.

The reversible rotation gear mechanism 12 is so constructed as to be locked when a torque exerted on the side of the electric motor 13 from the side of the planetary gear carrier 11 is smaller than a predetermined value, and to rotate the electric motor 13 when the predetermined value is exceeded.

The predetermined value is set at the maximum value of a steering torque arising in an ordinary steering operation, that is, 1 kgfm by way of example, or at a value (for example, 2 kgfm) obtained by adding a predetermined margin to the above maximum value.

Owing to such setting, the reversible rotation gear mechanism 12 is locked in the ordinary steering operation. Consequently, when a wheel tire has collided against a curbstone by way of example, the mechanism 12 rotates the electric motor 13, so that a torque larger than the predetermined value does not act on the gear ratio changing mechanism 8.

Numeral 14 denotes a torsion torque sensor of planetary gear type which detects the torsion torque of the torsion bar 4 interposed between the input shaft 1 and the input shaft side sleeve 2. The torsion torque sensor 14 is configured of a gear case which is connected to the input shaft 1 being the input side thereof and which supports a planetary gear of first stage, a gear case which is connected to the input shaft side sleeve 2 being the output side thereof and which supports a planetary gear of second stage, a sun gear which is rotatably supported and which is meshed with both the first-stage and second-stage planetary gears, a ring gear of first stage which is rotatably supported and which is meshed with the first-stage planetary gear, and a ring gear of second stage which is fixedly supported and which is meshed with the second-stage planetary gear. Thus, the turning angle of the first-stage ring gear is proportional to the torsion torque of the torsion bar 4. Since such a mechanism is known, the details of the operation of the torsion torque sensor 14 shall be omitted from description.

In the above, the symbols and examples of the numbers of teeth of the gears respectively formed in the input shaft side sleeve 2, output shaft side sleeve 5 and gear ratio changing mechanism 8 are set as listed in Table 1. Then, the relationship among the angular velocity $\omega 1$ of the input shaft side sleeve 2, the angular velocity $\omega 2$ of the output shaft side sleeve 5 and the angular velocity $\omega 3$ of the planetary gear carrier 11 is expressed by Equation (1). Therefore, the angular velocity ratio (transmission ratio) between the input shaft side sleeve 2 and the output shaft side sleeve 5 changes in accordance with the rotation of the planetary gear carrier 11.

$$\omega 2 = \frac{Z3 \cdot Z5}{Z4 \cdot Z6} \times \frac{Z1 \cdot Z7}{Z2 \cdot Z8} \omega 1 + \left( \frac{Z3 \cdot Z5}{Z4 \cdot Z6} - 1 \right) \frac{Z7}{Z8} \omega 3 \quad (1)$$

TABLE 1

| Symbols and Examples of the Numbers of Teeth | | | |
|---|---|---|---|
| Items | | Symbol | Example |
| Gear 2a of Input shaft side sleeve | | Z1 | 70 |
| Input side ring gear | Input side gear 9a | Z2 | 84 |
|  | Internal gear 9b | Z3 | 56 |
| Input side planetary gear 11a | | Z4 | 16 |
| Output side planetary gear 11b | | Z5 | 12 |
| Output side ring gear | Internal gear 10b | Z6 | 52 |
|  | Output side gear 10a | Z7 | 92 |
| Gear 5a of Output shaft side sleeve | | Z8 | 62 |

Here, when the electric motor 13 of the gear ratio changing steering system is stopped, the angular velocity $\omega 3$ of the planetary gear carrier 11 geared with this electric motor 13 becomes zero, and hence, the relationship between the respective angular velocities $\omega 1$ and $\omega 2$ of the input shaft side sleeve 2 and the output shaft side sleeve 5 is expressed by Equation (2).

$$\omega 2 = \frac{Z3 \cdot Z5}{Z4 \cdot Z6} \times \frac{Z1 \cdot Z7}{Z2 \cdot Z8} \omega 1 \quad (2)$$

It is accordingly possible to hold $\omega 2 \approx \omega 1$, that is, to set the angular velocity ratio (transmission ratio) substantially at 1 (one) by setting the numbers of teeth of the various gears as indicated by Equation (3) below. Thus, a steering gear box of standard type for use in a motor vehicle not equipped with the gear ratio changing system can be employed as it is, and curtailment in cost is realized owing to the common use of the component.

$$\frac{Z3 \cdot Z5}{Z4 \cdot Z6} \approx 1 / \frac{Z1 \cdot Z7}{Z2 \cdot Z8} \quad (3)$$

In the case where the numbers of teeth of the various gears are set as listed in Table 1 by way of example, $\omega 2 = 0.998 \omega 1 - 0.285 \omega 3$. It is accordingly understood that, when the electric motor 13 of the gear ratio changing steering system is stopped, $\omega 2 = 0.998 \omega 1$ holds, so the angular velocity ratio between the input shaft side sleeve 2 and the output shaft side sleeve 5 can be nearly equalized to 1 (one).

Next, as to the reversible rotation gear mechanism 12 including the worm shaft and the worm wheel in combination, let's calculate a worm shaft holding torque TWR for holding the planetary gear carrier 11 in the reversal thereof from the worm wheel side and a worm shaft rotating torque TWF for rotating the planetary gear carrier 11 in the forward rotation thereof from the worm shaft side.

The characteristic values of the worm gear are set as listed in Table 2, and a shaft torque loaded on the planetary gear carrier 22 is denoted by TE. Then, the worm shaft holding torque TWR in the reversal and the worm shaft rotating torque TWF in the forward rotation are respectively expressed by Equations (4) and (5).

TABLE 2

| Characteristic values of Worm gear | | | |
|---|---|---|---|
| Items | Symbol | Example | Unit |
| Gear ratio | | 20 | |
| Lead angle | $\gamma 0$ | 10 | ° |
| Radius of Worm wheel | r | 25 | mm |
| Radius of Worm shaft | rw | 7.1 | mm |
| Pressure angle | $\alpha n$ | 20 | ° |
| Friction factor | $\mu$ | 0.05 | |
| Friction angle of the surface of action | $\rho$ | 3.046 | ° |

In this table, $\rho = \tan^{-1}(\mu / \cos \alpha n)$.

$$T_{WR} = \frac{r_w \times T_E \cdot \tan(\gamma 0 - \rho)}{r} \quad (4)$$

$$= \frac{7.1 \times T_E \cdot \tan(10° - 3.046°)}{25}$$

$$= \frac{1}{28.9} T_E$$

$$T_{WF} = r_w (\cos \alpha_n \cdot \sin \gamma 0 + \mu \cos \gamma 0) \times \quad (5)$$

$$\frac{T_E / r}{\cos \alpha_n \cdot \cos \gamma 0 - \mu \sin \gamma 0}$$

$$= 7.1 (\cos 20° \cdot \sin 10° + 0.05 \cos 10°) \times$$

$$\frac{T_E / 25}{\cos 20° \cdot \cos 10° - 0.05 \sin 10°}$$

$$= \frac{1}{15.2} T_E$$

Figure 3:
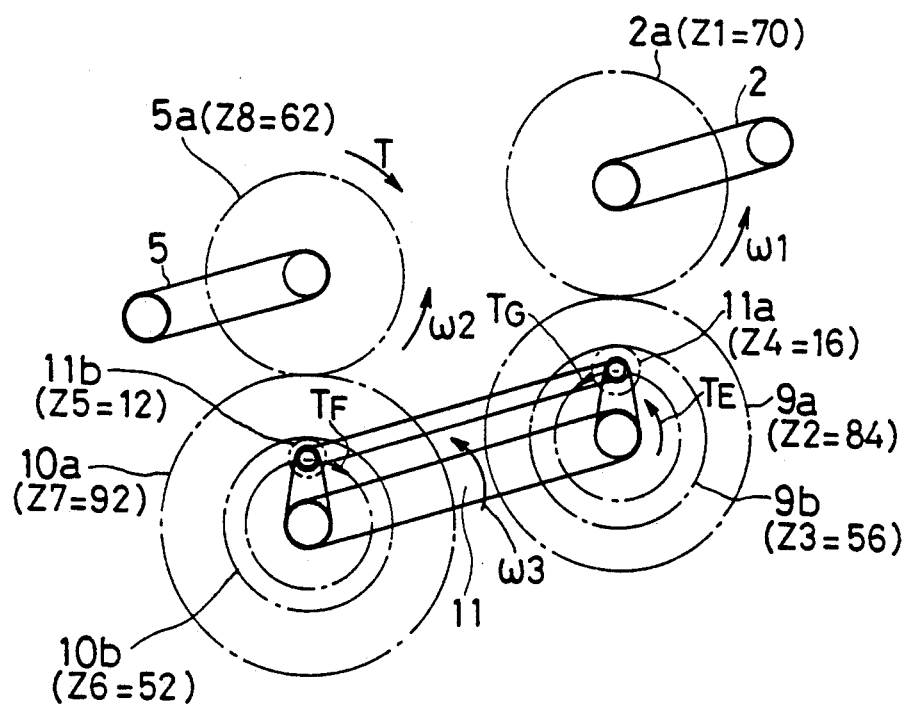
FIG. 3 is an explanatory view showing the transmission system of a steering force in the first embodiment of the present invention.

Here, the predetermined value T of the reversible rotation gear mechanism 8 is assumed to be 2 kgfm (200 kgfcm), and carrier reaction torques arising in the output side planetary gear 11b and the input side planetary gear 11a are respectively denoted by TF and TG as indicated in FIG. 3. Then, the shaft torque TE loaded on the planetary gear carrier 11 is expressed by the total of the carrier reaction torques TF and TG with the rotational directions thereof taken into account. Besides, the diameter of the pitch circle of each gear is proportional to the number of teeth of the gear. Therefore, the carrier reaction torques TF and TG and the shaft torque TE loaded on the planetary gear carrier 11 can be respectively expressed by Equations (6), (7) and (8).

$$T_F = T \frac{Z7}{Z8} = T \frac{92}{62} = 1.4839 \, T \quad (6)$$

$$T_G = T \frac{Z7}{Z8} \times \frac{Z5}{Z6} \times \frac{Z3}{Z4} \quad (7)$$

$$= T \frac{92 \times 12 \times 56}{62 \times 52 \times 16} = 1.1985 \, T$$

$$T_E = (-1.4839 + 1.1985) T = -0.285 \times 200 \quad (8)$$

$$= -57 \text{ kgfcm}$$

By substituting the shaft torque TE expressed by Eq. (8) into Eqs. (4) and (5), the worm shaft holding torque TWR in the reversal from the worm wheel side and the worm shaft rotating torque TWF in the forward rotation from the worm shaft side can be respectively expressed by Eqs. (9) and (10).

$$T_{WR} = \frac{1}{28.9} T_E = \frac{1}{28.9} \times 57 = 1.97 \text{ kgfcm} \quad (9)$$

$$T_{WF} = \frac{1}{15.2} T_E = \frac{1}{15.2} \times 57 = 3.75 \text{ kgfcm} \quad (10)$$

Accordingly, in the ordinary steering operation in which the predetermined value T of the steering torque is smaller than 2 kgfm, the reversible rotation gear mechanism 12 is held locked without being reversed, owing to the aforementioned setting of the characteristic values of the worm gear which constitutes the reversible rotation gear mechanism 12. Therefore, an input from the output shaft side sleeve 5 based on a road surface reaction etc. is precisely transmitted to the unshown steering handle through the gear ratio changing mechanism 8, input shaft side sleeve 2, torsion bar 4 and input shaft 1. At this time, on condition that the gear ratio changing motor 13 is stopped, the angular velocity ratio or the transmission ratio between the input shaft side sleeve 2 and the output shaft side sleeve 5 becomes approximately 1 (one), and when the electric motor 13 is rotated, any desired value of the angular velocity ratio (transmission ratio) as expressed by Eq. (1) can be attained.

Besides, in a case where the wheel tire collides against the curbstone or the like in the stopped state of the electric motor 13 to produce an input which is far greater than the predetermined value T (2 kgfm) of the steering torque, the reversible rotation gear mechanism 12 is reversely rotated. Then, when the rotational difference between the output shaft side sleeve 5 and the input shaft side sleeve 2 has become a predetermined value, for example, ±30°, the stopper engagement portion 6 formed between these sleeves 5 and 2 as shown in FIGS. 1 and 2 comes into engagement. Thenceforth, the torque is transmitted by the stopper engagement portion 6 without the intervention of the gear ratio changing mechanism 8. Therefore, the shaft torque TE which is loaded on the planetary gear carrier 11 constituting the gear ratio changing mechanism 8 becomes 57 kgfcm as indicated by Eq. (8) and does not become still larger. Accordingly, the gear ratio changing mechanism 8 can be made small and compact.

Figure 4:
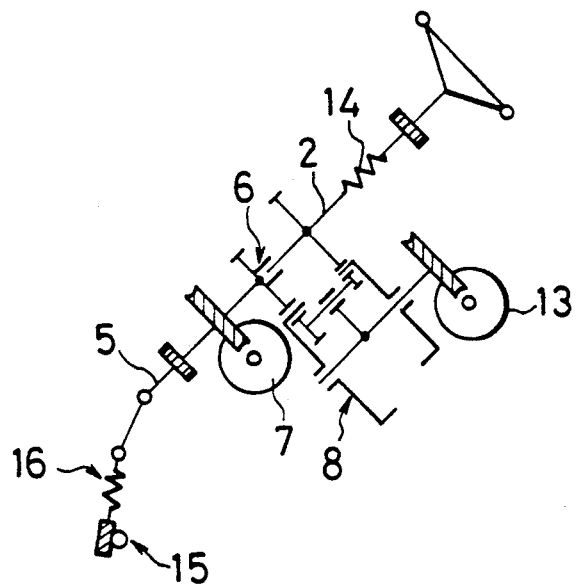
FIG. 4 is a general view of a steering system showing a modification to the first embodiment of the present invention.

Incidentally, the embodiment has been described as to the example in which the stopper engagement portion 6 formed between the output shaft side sleeve 5 and the input shaft side sleeve 2 is brought into engagement by the rotation of the output shaft side sleeve 5 against the friction of the reversible rotation gear mechanism 12. In this regard, the engagement timing of the stopper engagement portion 6 can be rendered earlier in such a way that a torsion torque sensor 16 is interposed between the output shaft side sleeve 5 and the pinion shaft 15 of the gear box as shown in FIG. 4, and that, when a steering torque detected by the torsion torque sensor 16 has exceeded the ordinary value (for example, 2 kgfm), the gear ratio changing motor 13 is driven in the engaging direction of the stopper 6.

When the gear ratio changing motor 13 is reversely rotated by an external force ascribable to the collision against the curbstone or the like as stated above, the phases of the handle angle of the steering handle and the steering angle of the wheel tire side are shifted. Regarding this forcible phase shift, at the same time that the locked state of the wheel tire attributed to the collision against the curbstone or the like is released, a control for restoring the phase of the handle angle to a predetermined phase is performed for a fixed time period (for example, for 10 seconds) in accordance with a command from a control unit not shown. On this occasion, however, in a case where the driver of the motor vehicle firmly grasps and holds the steering handle and where the torsion torque value detected by the torsion torque sensor 14 is excessive, the phase adjustment control is suspended once, and it is initiated again upon the lapse of a fixed time period (for example, after 1 second). Such controls are repeated until the phases come into agreement.

Incidentally, a gear mechanism which is constituted by the power assisting gear 5b formed in the output shaft side sleeve 5 and the gear 7a formed in the output shaft of the electric motor 7 of the electric power steering system is also endowed with a structure easy of reversal.

Figure 5:
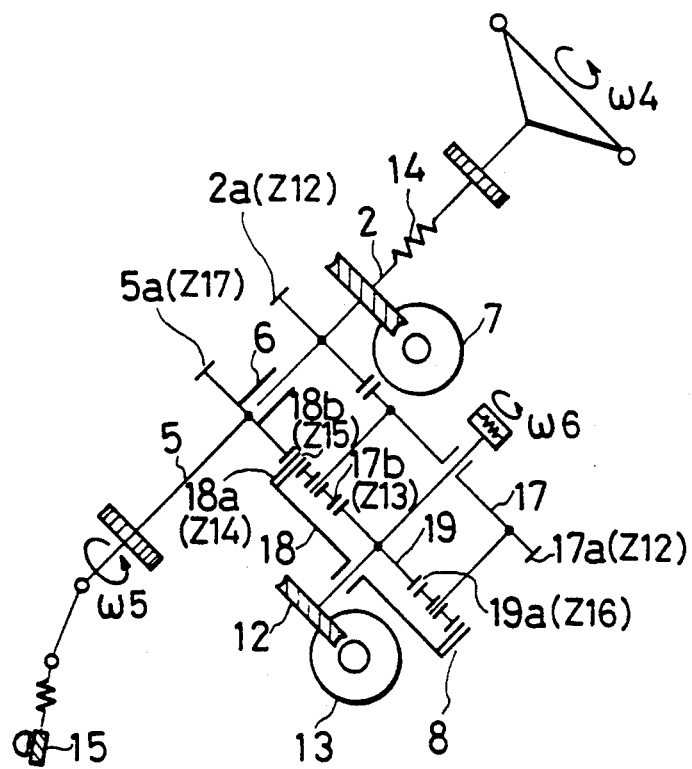
FIG. 5 is a general view of a steering system showing the second embodiment of the present invention.

FIG. 5 shows the second embodiment of a gear ratio changing mechanism 8. This gear ratio changing mechanism 8 is configured of a planetary gear carrier 17 which includes an input side gear 17a meshed with a gear 2a formed at the outer periphery of an input shaft side sleeve 2, an output side ring gear 18 which includes an output side gear 18a meshed with a gear 5a formed at the outer periphery of an output shaft side sleeve 5 and an internal gear 18b meshed with a planetary gear 17b turnably supported by the planetary gear carrier 17, and a sun gear 19 which includes an external gear 19a meshed with the planetary gear 17b turnably supported by the planetary gear carrier 17 and which is connected to an electric motor for a gear ratio changing control 13 through a reversible rotation gear mechanism 12. By the way, the same numerals are assigned to the same components as in the first embodiment.

When, in the above, the symbols and examples of the numbers of teeth of the gears respectively formed in the input shaft side sleeve 2, output shaft side sleeve 5, planetary gear carrier 17, output side ring gear 18 and sun gear 19 are set as listed in Table 3 below, the relationship among the angular velocity ω4 of the input shaft side sleeve 2, the angular velocity ω5 of the output shaft side sleeve 5 and the angular velocity ω6 of the sun gear 19 is expressed by Equation (11). As in the first embodiment, therefore, the angular velocity ratio (transmission ratio) between the input shaft side sleeve 2 and the output shaft side sleeve 5 can be changed in accordance with the rotation of the sun gear 19.

$$\omega 5 = \frac{Z14}{Z17} \frac{Z11}{Z12} \left( \frac{Z16}{Z15} + 1 \right) \omega 4 + \frac{Z16}{Z15} \frac{Z14}{Z17} \omega 6 \quad (11)$$

TABLE 3

| Symbols and Examples of the Numbers of Teeth | | | |
|---|---|---|---|
| Items | | Symbol | Example |
| Gear 2a of Input shaft side sleeve | | Z11 | 39 |
| Planetary gear carrier | Input side gear 17a | Z12 | 72 |
| | Planetary gear 17b | Z13 | 16 |
| Output side ring gear | Output side gear 18a | Z14 | 63 |
| | Internal gear 18b | Z15 | 56 |
| Sun gear | External gear 19a | Z16 | 24 |
| Gear 5a of Output shaft side sleeve | | Z17 | 48 |

Here, when the electric motor 13 of the gear ratio changing steering system is stopped, the angular velocity ω6 of the sun gear 19 connected with this electric motor 13 becomes zero, and hence, the relationship between the respective angular velocities ω4 and ω5 of the input shaft side sleeve 2 and the output shaft side sleeve 5 is expressed by Equation (12).

$$\omega 5 = \frac{Z14}{Z17} \frac{Z11}{Z12} \left( \frac{Z16}{Z15} + 1 \right) \omega 4 \quad (12)$$

By setting the numbers of teeth of the various gears as listed in Table 3, accordingly, the transmission ratio between the input shaft side sleeve 2 and the output shaft side sleeve 5 can be nearly equalized to 1 (one) as indicated by Equation (13). Thus, as in the first embodiment, a steering gear box of standard type for use in a motor vehicle not equipped with the gear ratio changing system can be employed as it is, and curtailment in cost is realized owing to the common use of the component.

$$\frac{\omega 5}{\omega 4} = \frac{63}{48} \times \frac{39}{72} \left( \frac{24}{56} + 1 \right) \quad (13)$$

Incidentally, it is quite the same as in the first embodiment and shall not be described in detail that, owing to the formation of the stopper engagement portion 6 between the input shaft side sleeve 2 and the output shaft side sleeve 5 and the provision of the reversible rotation gear mechanism 12 between the gear ratio changing motor 13 and the sun gear 19 constituting the gear ratio changing mechanism 8, any excessive external force is prevented from acting on the gear ratio changing mechanism 8, so this gear ratio changing mechanism 8 can be reduced in size.

Figure 6:
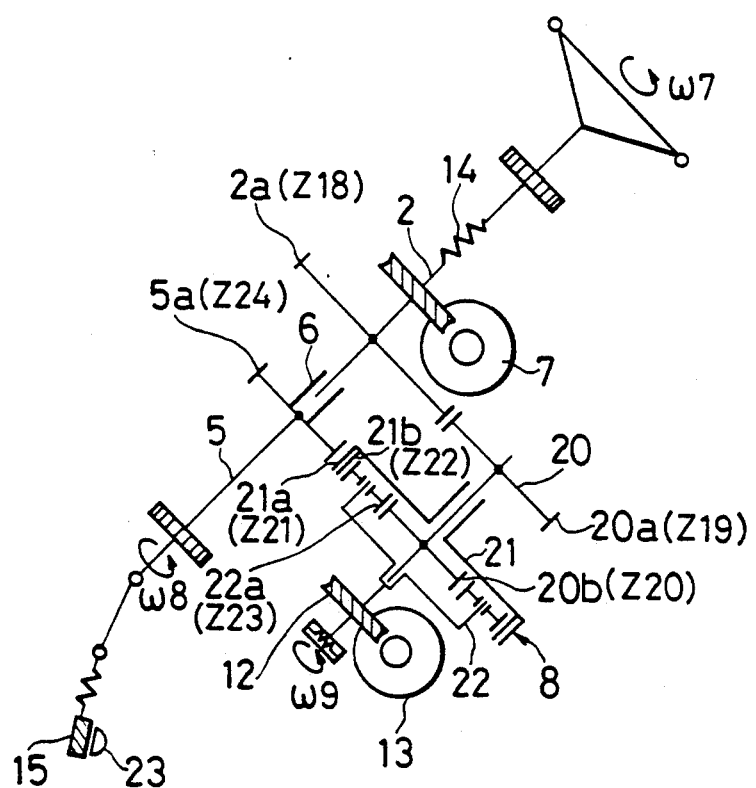
FIG. 6 is a general view of a steering system showing the third embodiment of the present invention.

FIG. 6 shows the third embodiment of a gear ratio changing mechanism 8. This gear ratio changing mechanism 8 is configured of a sun gear 20 which is coaxially provided with an input side gear 20a meshed with a gear 2a formed at the outer periphery of an input shaft side sleeve 2, an output side ring gear 21 which is provided with an output side gear 21a meshed with a gear 5a formed at the outer periphery of an output shaft side sleeve 5, and a planetary gear carrier 22 which turnably supports a planetary gear 22a meshed with the external gear 20b of the sun gear 20 and an internal gear 21b formed on the inner peripheral side of the output side ring gear 21 and which is connected to an electric motor for a gear ratio changing control 13 through a reversible rotation gear mechanism 12. By the way, the same numerals are assigned to the same components as in the first embodiment.

When, in the above, the symbols and examples of the numbers of teeth of the gears respectively formed in the sun gear 20, output side ring gear 21 and planetary gear carrier 22 are set as listed in Table 4 below, the relationship among the angular velocity $\omega 7$ of the input shaft side sleeve 2, the angular velocity $\omega 8$ of the output shaft side sleeve 5 and the angular velocity $\omega 9$ of the planetary gear carrier 22 is expressed by Equation (14). It is therefore the same as in the first or second embodiment that the angular velocity ratio (transmission ratio) between the input shaft side sleeve 2 and the output shaft side sleeve 5 can be changed in accordance with the rotation of the planetary gear carrier 22.

$$\omega 8 = -\frac{Z18}{Z19} \frac{Z20}{Z22} \frac{Z21}{Z24} \omega 7 - \frac{Z21}{Z24}\left(1 - \frac{Z20}{Z22}\right)\omega 9 \quad (14)$$

TABLE 4

| Symbols and Examples of the Numbers of Teeth | | | |
|---|---|---|---|
| Items | | Symbol | Example |
| Gear 2a of Input shaft side sleeve | | Z18 | 71 |
| Sun gear | Input side gear 20a | Z19 | 40 |
| | External gear 20b | Z20 | 24 |
| Output side ring gear | Output side gear 21a | Z21 | 63 |
| | Internal gear 21b | Z22 | 56 |
| Planetary gear carrier | Planetary gear 22a | Z23 | 16 |
| Gear 5a of Output shaft side sleeve | | Z24 | 48 |

Here, when the electric motor 13 of the gear ratio changing steering system is stopped, the relationship between the respective angular velocities $\omega 7$ and $\omega 8$ of the input shaft side sleeve 2 and the output shaft side sleeve 5 is expressed by Equation (15). Accordingly, the transmission ratio between the input shaft side sleeve 2 and the output shaft side sleeve 5 can be nearly equalized to 1 (one) as indicated by Equation (16), by setting the numbers of teeth of the various gears as listed in Table 4.

$$\omega 8 = -\frac{Z18}{Z19} \frac{Z20}{Z22} \frac{Z21}{Z24} \omega 7 \quad (15)$$

$$\frac{\omega 8}{\omega 7} = -\frac{71}{40} \times \frac{24}{56} \times \frac{63}{48} = -0.998 \approx -1 \quad (16)$$

In the above, the rotational directions of the input shaft side sleeve 2 and the output shaft side sleeve 5 become opposite as indicated by the different signs by Eq. (15), and a rack shaft 23 needs to be arranged behind the pinion shaft 15 as illustrated in FIG. 6. Therefore, the gear box of the standard type for use in the motor vehicle not equipped with the gear ratio changing system cannot be employed as it is. However, it is quite the same as in each of the two foregoing embodiments that, owing to the formation of the stopper engagement portion 6 between the input shaft side sleeve 2 and the output shaft side sleeve 5 and the provision of the reversible rotation gear mechanism 12 between the gear ratio changing motor 13 and the planetary gear carrier 22 constituting the gear ratio changing mechanism 8, any excessive external force is prevented from acting on the gear ratio changing mechanism, so this gear ratio changing mechanism can be reduced in size.

Figure 7A:
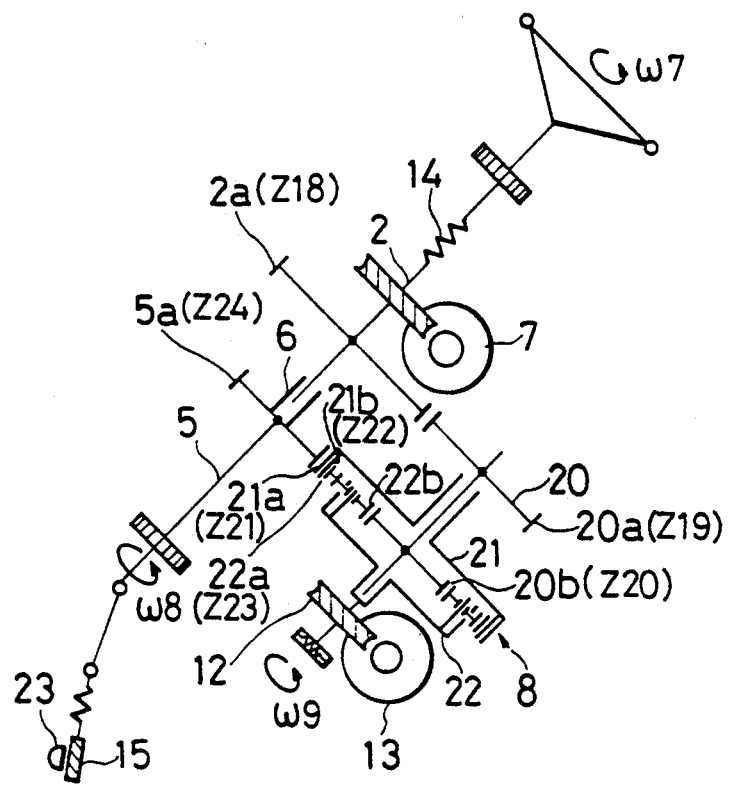
FIGS. 7 (A) and 7 (B) show the fourth embodiment of the present invention, in which FIG. 7 (A) is a general view of a steering system, while FIG. 7 (B) is an explanatory view illustrative of the meshed situation among a planetary gear, a counter gear, a sun gear and an output side ring gear.
Figure 7B:
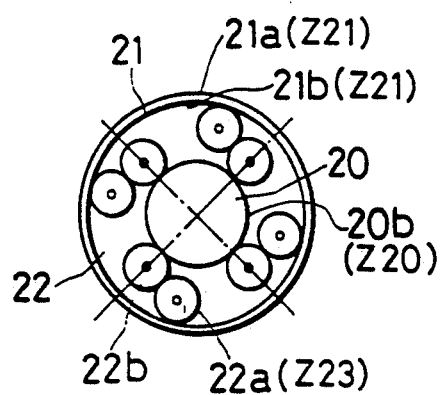

FIGS. 7 (A) and 7 (B) show the fourth embodiment of a gear ratio changing mechanism 8. In the third embodiment described above, the planetary gear 22a turnably supported by the planetary gear carrier 22 is meshed with both the external gear 20b of the sun gear 20 and the internal gear 21b formed on the inner peripheral side of the output side ring gear 21. In contrast, in the fourth embodiment, as illustrated in FIG. 7 (B), a planetary gear 22a turnably supported by a planetary gear carrier 22 is meshed with only an internal gear 21b formed on the inner peripheral side of an output side ring gear 21, and a counter gear 22b meshed with both the planetary gear 22a and the external gear 20b of a sun gear 20 is turnably supported by the planetary gear carrier 22.

Owing to the adoption of the construction as described above, as in the third embodiment, the transmission ratio between an input shaft side sleeve 2 and an output shaft side sleeve 5 can be nearly equalized to 1 (one) as indicated by Equation (16), by setting the numbers of teeth of the various gears as listed in Table 4. Simultaneously, since the rotational directions of the input shaft side sleeve 2 and the output shaft side sleeve 5 become identical, a rack shaft 23 can be arranged in front of a pinion shaft 15 as illustrated in FIG. 7 (A). Thus, the steering gear box of the standard type for use in the motor vehicle not equipped with the gear ratio changing system can be employed as it is, and the curtailment in cost is realized owing to the common use of the component.

When the construction of the present invention as stated above is adopted, a torque which is larger than the maximum value of an ordinary steering torque or a value obtained by adding a predetermined margin to the maximum value is not input to a gear ratio changing mechanism, so that the gear ratio changing mechanism including an electric motor for a gear ratio changing control can be made small in size. Moreover, when the angular velocity ratio between an input shaft and an output shaft is set at 1 (one) in the state in which the electric motor 13 of the gear ratio changing mechanism 8 is stopped, a gear box for use in a motor vehicle equipped with a steering gear ratio changing system can be also used as a gear box for use in a motor vehicle not equipped with the steering gear ratio changing system, so that curtailment in cost can be achieved. In this manner, the present invention can bring forth great effects in practical use conjointly with the simple construction.

While the presently preferred embodiments of the present invention have been shown and described, it is to be understood that this disclosure is for the purpose of illustration and that various changes and modifications may be made without departing from the scope of the invention as set forth in the appended claims.

I claim:

1. A steering system for a motor vehicle having, an input shaft connected with a steering wheel via a first torque sensor for steering said motor vehicle, an output shaft coaxially connected to said input shaft for transmitting a steering force from said steering wheel to a pinion shaft via a second torque sensor, and an assist motor meshed with said output shaft via a worm gear for assisting said steering force, an improvement of the system which comprises:

an input shaft sleeve coaxially interposed between said input shaft and said output shaft for transmitting said steering force to said output shaft;

a first gear formed on an outside periphery of said sleeve;

a second gear formed on an outside periphery of said output shaft;

an input ring gear meshed with said first gear and provided in a gear ratio changing mechanism;

an inside input gear formed inside said input ring gear;

an input planetary gear meshed with said inside input ring gear and supported by a carrier;

an output planetary gear supported by said carrier and being coaxial with said input planetary gear;

an output ring gear meshed with said second gear and being coaxial with said input ring gear;

an inside output gear formed inside said output ring gear and meshed with said output planetary gear;

stopper means formed between said input shaft and said output shaft for restricting a rotational and relative movement therebetween; and a motor connected with said carrier via a reversible gear for changing a gear ratio of said input and output planetary gears so as to stop said gear ratio changing motor when said steering torque is larger than a predetermined value and to rotate said gear ratio changing motor when a steering torque based on said steering force is smaller than said predetermined value;

said gear ratio changing motor becoming free to rotate when said steering torque is larger than said predetermined value so as to effectively absorb a shock exerted from said output shaft and to be widely and easily used for any types of said steering system.

2. A steering system for a motor vehicle having, an input shaft connected with a steering wheel via a first torque sensor for steering said motor vehicle, an output shaft coaxially connected to said input shaft for transmitting a steering force from said steering wheel to a pinion shaft via a second torque sensor, and an assist motor meshed with said output shaft via a worm gear for assisting said steering force, an improvement of the system which comprises:

an input shaft sleeve coaxially interposed between said input shaft and said output shaft for transmitting said steering force to said output shaft;

a first gear formed on an outside periphery of said sleeve;

a second gear formed on an outside periphery of said output shaft;

an input ring gear meshed with said first gear and provided in a gear ratio changing mechanism;

an inside input gear formed inside said input ring gear;

an input planetary gear meshed with said inside input ring gear and supported by a carrier;

an output planetary gear supported by said carrier and being coaxial with said input planetary gear;

an output ring gear meshed with said second gear and being coaxial with said input ring gear;

an inside output gear formed inside said output ring gear and meshed with said output planetary gear;

stopper means formed between said input shaft and said output shaft for restricting a rotational and relative movement therebetween; and a motor connected with said carrier via a reversible gear for changing a gear ratio of said input and output planetary gears so as to stop said gear ratio changing motor when a steering torque based on said steering force is larger than a predetermined value and to rotate said gear ratio changing motor when said steering torque is smaller than said predetermined value;

said gear ratio changing motor applying to generate a torque increase when said steering torque is larger than said predetermined value so as to effectively absorb a shock exerted from said output shaft and to be widely and easily used for any types of said steering system.

3. The system according to claim 1, further comprising:

an angular velocity ratio between said input and output shafts being set 1 (one) when said reversible gear driven by said gear ratio changing motor is fixed.

* * * * *